O. R. SACKETT.
AIR VALVE.
APPLICATION FILED JAN. 10, 1920.
1,378,426. Patented May 17, 1921.
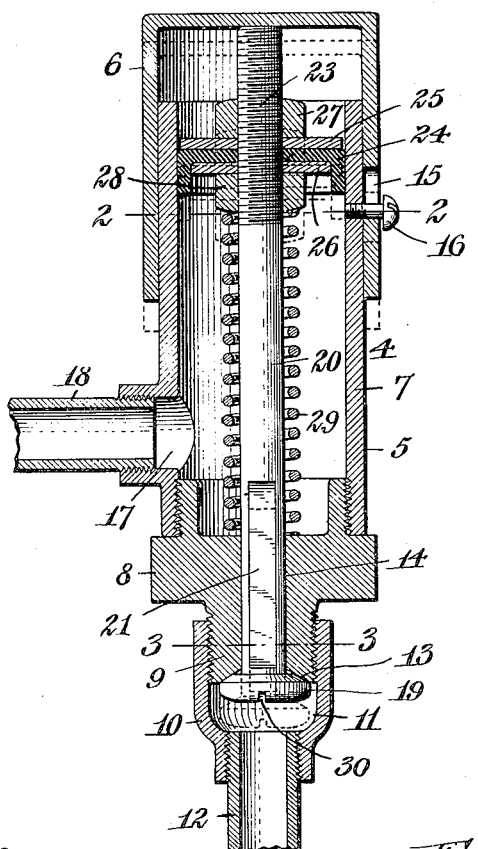
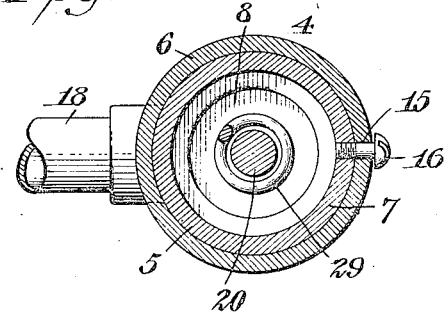
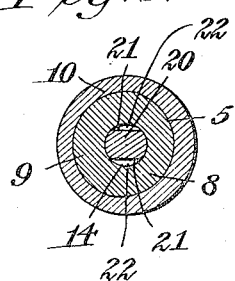
Witness:
Jacob Oberst, Jr.
Orville R. Sackett, Inventor.
By Emil Neuhardt
Attorney.

UNITED STATES PATENT OFFICE.

ORVILLE R. SACKETT, OF NIAGARA FALLS, NEW YORK.

AIR-VALVE.

1,378,426.   Specification of Letters Patent.   Patented May 17, 1921.

Application filed January 10, 1920. Serial No. 350,626.

*To all whom it may concern:*

Be it known that I, ORVILLE R. SACKETT, a citizen of the United States, residing at Niagara Falls, in the county of Niagara and State of New York, have invented certain new and useful Improvements in Air-Valves, of which the following is a specification.

My invention relates to an improved valve, which, while adapted for use for many and various purposes, is more especially adapted for use on locomotives in air lines in connection with bell ringers.

The primary object of my invention is the provision of an air valve devoid of all washers and stuffing boxes, and which consequently is more durable than valves of standard form in which washers and stuffing boxes are employed, due to the fact that the washers become quickly worn out and the packing within the stuffing boxes often blow out.

Another object of my invention is the provision of a valve of this type which permits of the valve head and its co-acting valve to be ground in without taking the valve apart, provision being made to disconnect the valve at one end from the air or other supply pipe to expose the valve head for this purpose.

Another object of my invention is to so construct the valve that the air passing through it will serve to make the valve air-tight, and so that a pressure chamber is provided within the valve having a packing-ring therein which is expansible against the surrounding wall of the casing and serves as one of the end walls of the pressure chamber.

With these objects in view, and others which will be apparent from the description to follow, my invention consists in the novel features of construction, and in the combination and arrangement of parts to be hereinafter described and more particularly pointed out in the subjoined claims.

In the drawings:—

Figure 1 is a central longitudinal section through my improved valve.

Fig. 2 is a cross section taken on line 2—2, Fig. 1.

Fig. 3 is a cross section taken on line 3—3, Fig. 1.

Referring now specifically to the drawings, 4 designates the valve casing, which comprises two relatively-movable parts 5, 6, the part 5, which in the drawing is shown as a fixed part, is formed of two members 7, 8, member 7 being an open-ended cylinder internally threaded at one end to receive member 8, which latter is in the form of a cap having an externally-threaded boss 9 onto which a pipe fitting 10 is threaded, said fitting 10 providing a valve head chamber 11 and having a supply pipe 12 connected thereto.

At the outer end of the boss 9 a valve-seat 13 is formed and through this boss, co-axial with said valve seat, a cylindrical bore 14 is formed. The part 6, which is a cup-like member inverted over the upper open end of the part 5, closes said upper end and it is provided with a longitudinal slot 15 through which a stop screw 16 is passed, which is threaded into the part 5. Preferably, parts 5 and 6 which constitute the relatively-movable members of the valve casing are cylindrical in cross section, and the part 6, which may be termed the "actuator member," operable either by hand or foot, as may be desired, is therefore slidable over the upper or outer end of the part 5 of the valve casing and its limits of movement are determined by the slot 15 formed therein. The part 5 of the valve casing is provided with a lateral discharge or outlet opening 17 to which a pipe 18 is connected which may lead to the bell ringer or any other object with which the valve may be associated.

Seated against the valve seat 13 at the lower end of the valve casing, or more particularly at the outer end of the boss 9, is a valve head 19 having a stem 20 extending through the bore 14 of the cap 8. Stem 20 is continued upwardly through the interior of the valve casing with its upper end in contact with the inner surface of the end wall of the movable part 6 of the valve casing, said valve being flattened at diametrically opposite points, as at 21, along the region of the cap 8 so that air passages 22 are formed through the cap along opposite sides of the valve stem. The upper end of the valve stem is threaded, as at 23, and it has a piston or plunger thereon comprising a leather or other flexible cup-shaped packing ring 24, metallic disks 25, 26, and nuts 27, 28; the disk 25 being at the upper or outer surface of the packing ring and having the nut 27 bearing thereagainst, said nut being threaded onto the threaded portion 23 of the valve stem and being adjustable along said threaded portion.

The disk 26 is of smaller diameter than the disk 25, and has the marginal portion of the leather or other flexible packing-ring bent over the edge thereof, with the outer surface of the bent portion of said ring in contact with the inner surface of the surrounding wall of the casing. The nut 28 bears against the inner or under side of the smaller disk, and like the nut 27 is adjustable along the threaded portion of the valve stem so that the piston or plunger may be adjusted within the casing, for a purpose to appear hereinafter.

Surrounding the valve stem 20 is a spiral spring 29 bearing with one end against the cap 8, and with its other end against the nut 28 at the inner side of the piston or plunger. It may here be stated that the piston or plunger is free to slide within the valve casing, and when the actuator member or part 6 of the casing is depressed, the valve stem with its plunger adjusted thereon will cause unseating of the valve head 19, thereby allowing air, or any other medium employed, to pass upwardly through the passages 22 at opposite sides of the valve stem and enter the valve casing, from which it passes out through the outlet 17 and simultaneously therewith acts against the piston or plunger to cause the circumferential portion of the packing-ring to act against the inner surface of the valve casing and render the piston or plunger air-tight.

By removing the fitting 10 from the valve casing or by disconnecting the supply pipe 12 from the fitting 10, access may be easily had to the valve-head 19. By depressing the actuator member or part 6 of the casing, the valve-head will be moved away from its seat 13, allowing a suitable grit paste to be placed against the seating portion of the valve-head or against the valve-seat, and when releasing the actuator member or part 6, the spring 29 surrounding the stem 20 will cause the valve-head to be moved against the valve-seat with the paste between the two. By rotating the valve-head, the seating portion thereof and the valve-seat may be ground perfectly so that any leakage occurring by reason of wearing of either of these portions of the device, will be eliminated, and for convenience in rotating the valve-head it is provided with a cross-cut or kerf 30 into which the end of a screw-driver or other suitable tool may be inserted for this purpose.

My improved valve is constructed for convenient manipulation by the engineer of a locomotive while attending to other duties, as it is simply necessary, if used as a foot valve, to depress the actuator member or part 6 with the foot, which leaves the hands free for other work. Furthermore, the mere removal of the foot from the valve will assure an absolute cut-off of the air so that the ringing of bells around stations or residential districts through which trains pass can be easily overcome, thereby avoiding annoyance to the public, saving wear on the bell ringer and the air pump that is usually employed to furnish the air to operate the bell ringer, and also saving in the consumption of fuel consumed to generate stem to work the air pump. Moreover, due to the fact that it is necessary to depress the actuator member or part 6 of the valve casing, it acts as a safety device in that it serves as a means to inform the fireman that the engineer has failed to retain the valve in actuating position, which will enable the fireman to ascertain if anything has happened to prevent the engineer attending to his duties.

While the invention is particularly designed as an air-valve to be used in connection with bell ringers, or to blow the whistle of a locomotive, it can also be used as a release valve for the driver, or a tender brake, and for various other purposes.

When the valve is disconnected from the supply and outlet pipes, the valve head 19 is fully exposed, and before placing the valve into service, it can be easily ascertained whether it is capable of properly functioning without separating any of the parts of the valve-casing.

Having thus described my invention, what I claim is:—

1. An air-valve comprising a casing having an inlet through its lower end wall and an outlet in its side, a valve longitudinally movable and having a valve-stem guided for movement in said inlet and a valve-head at one end of said valve-stem closing the outer end of said inlet, said valve having a cut-away portion to permit air to pass through said inlet along said valve-stem, a piston adjustable on said valve-stem, and a spring surrounding said valve-stem and bearing with one end against said lower end wall and with its other end against said piston to retain said valve-head in closed position, a portion of said casing being movable to cause actuation of said valve-stem and piston against the action of said spring.

2. An air-valve comprising a casing having two relatively-movable parts, one of said parts having a wall at one end and an inlet through said end wall and having also an outlet, a valve arranged co-oxial with said casing and having a valve-stem passing through said inlet and a valve-head closing the outer end of said inlet, said valve-stem having a cut-away portion along the region of said inlet to permit air to pass through said inlet into said valve casing, the other part of said casing bearing against the end of the valve-stem, opposite said valve-head, a piston secured to said valve-stem within the first-mentioned part of said valve casing, and a spring surrounding said valve-stem and bearing with one end against said end wall and with its other end against said piston.

3. An air-valve comprising a two-part casing, one of said parts being formed of an open-ended cylinder having a lateral outlet and being internally threaded at one end and a cap threaded into said internally threaded end and having an air inlet formed by an axially arranged bore and a valve-seat at the outer end of said bore, the other part of said casing being cup-shaped to fit over the opposite end of said open-ended cylinder and having a longitudinal slot therein, a stop element projecting from said open-ended cylinder through said slot, a valve having a valve-stem extending through said bore and a valve-head adapted to seat against said valve-seat, a piston adjustable on said valve-stem within said open-ended cylinder, and a spiral spring surrounding said valve-stem and bearing with one end against said cap and with its other end against said piston.

4. An air-valve comprising a casing having an inlet in one wall, an outlet in another wall, and a valve-seat at the outer end of said inlet, a valve having a valve-head closing against said valve-seat and a valve-stem extending into said casing, a piston on said valve-stem comprising a flexible cup-shaped packing ring, a pair of metallic disks lying against the upper and lower surfaces of said packing ring and nuts bearing against said disks, one nut being above and the other below said packing ring, and a spring surrounding said valve-stem bearing with one end against the lower nut of said piston and with its other end against said first-mentioned wall to exert pressure against said piston to cause seating of said valve-head.

5. An air valve comprising a two part casing, one of said parts being formed of an open-ended cylinder having a lateral outlet and being internally threaded at one end and a cap threaded into said internally threaded end and having an air inlet formed by an axially arranged bore and a valve seat at the outer end of said bore, the other part of said casing being cup-shaped to fit over the opposite end of said open ended cylinder, a valve having a valve stem extending through said bore and a valve head adapted to seat against said valve seat, a piston adjustable on said valve stem within said open-ended cylinder, and a spiral spring surrounding said valve stem and bearing with one end against said cap and with its other end against said piston.

In testimony whereof I affix my signature.

ORVILLE R. SACKETT.